Oct. 30, 1951 W. H. SCHOLL 2,573,366
MEANS OF SEALING PIPE JOINTS
Filed Nov. 10, 1948
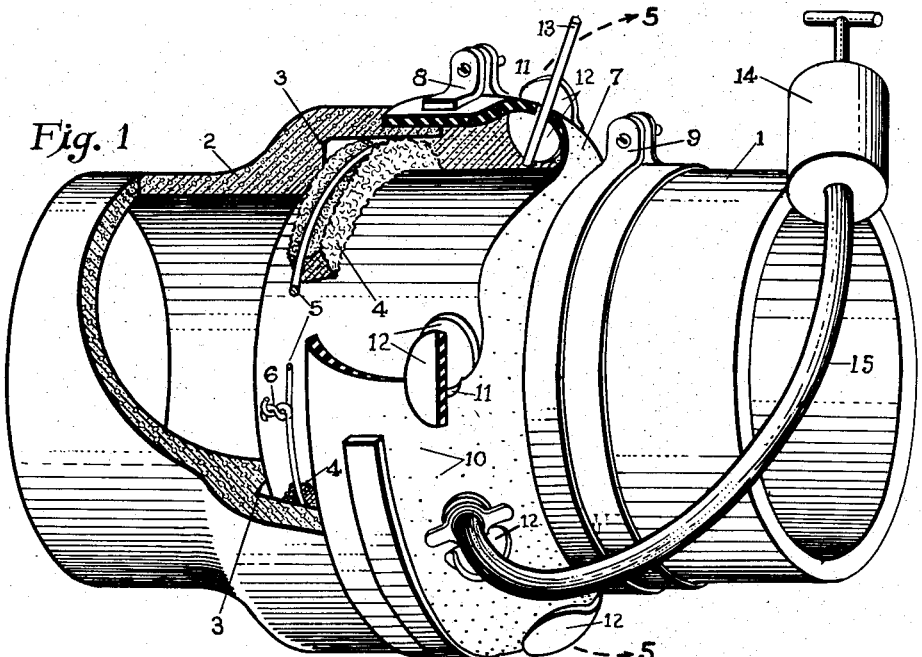
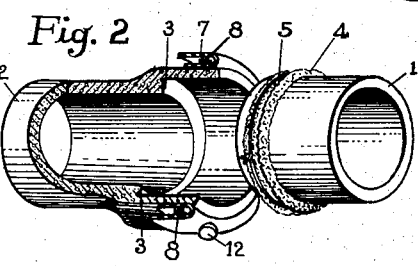
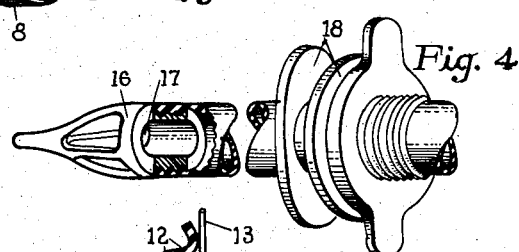
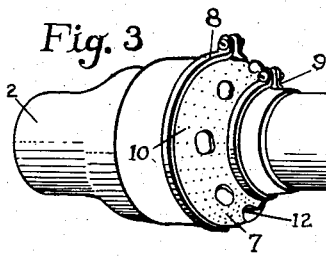
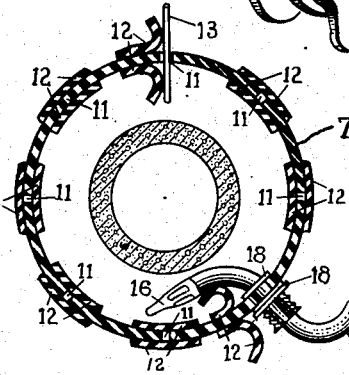
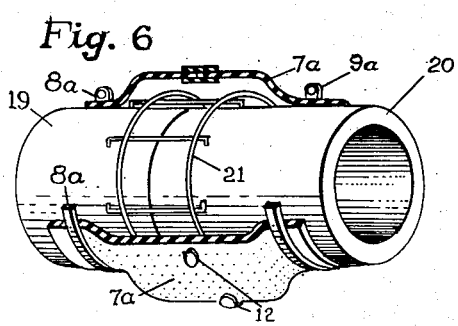
INVENTOR.
Walter H. Scholl
BY Jacobi & Jacobi Patented Oct. 30, 1951

2,573,366

UNITED STATES PATENT OFFICE 2,573,366

MEANS OF SEALING PIPE JOINTS

Walter H. Scholl, Washington, D. C.

Application November 10, 1948, Serial No. 59,265

2 Claims. (Cl. 285—115)

My invention relates to new and useful improvements in the method and means of sealing pipe joints or the ends of other hollow bodies and relates more particularly to joints effected by the pouring of material, such as cement, into an annular recess formed between the ends of pipes or other joints to be joined.

The primary object of the invention resides in the method and means for providing a fluid-tight joint, capable of being effected quickly and efficiently and at a minimum of expense either above or below the surface of water.

A further object of the invention resides in the provision of a permeable internal seal through which water, air and gasses may be extruded, but which will be effective in precluding the escape of cementitious material from the joint.

A further object of the invention resides in the provision of an external seal formed of an elastic material and made permeable to permit the extrusion therethrough of water, air and gasses, as the cementitious material is poured or pumped into the joint.

Still another object of the invention resides in the provision of an external seal of the character mentioned provided with valves permitting the introduction therethrough of cementitious material or the extrusion therethrough or the expulsion therethrough of air or other gas, or water or other liquid, but preventing the intrusion of external water or other undesirable substance, such as sand or mud as may be encountered at the site of pipe-joining, the said valves being of the self-closing type.

Still another object of the invention resides in the provision of means for forming a seal-type joint between pipes or similar bodies which is simple and durable in construction, inexpensive to manufacture and one which will be very efficient and useful in operation.

With these and numerous other objects in view, my invention consists of the novel features of construction, combination and arrangement of parts as will be hereinafter referred to and more particularly pointed out in the specification and claims.

In the accompanying drawing, forming a part of this application:

Figure 1 is a perspective view with parts broken away and parts in section, showing two pipe sections about to be joined together under my improved method and with my improved means;

Figure 2 is a similar view with the pipe sections separated and the external seal bent out of effective position;

Figure 3 is a perspective view of two pipe sections joined and sealed together under my improved method and with my improved means and with the interior seal attached to the spigot section of pipe;

Figure 4 is a perspective view, partly in section and with parts broken away, showing the nozzle and valve on the hose used for introducing the cementitious material to the pipe joint;

Figure 5 is a transverse section through the device, as seen on the line 5—5 of Figure 1, showing the nozzle in place within the external seal for the introduction of the cementitious material into the joint; and Figure 6 is a perspective view, with parts broken away and parts in section, showing a slight modification of the invention.

It is a well-known fact that the strength, impermeability and bond of a joint, utilizing cement, or the like, and the density of this cement, or other plastic material, is increased in proportion to the amount of water, or other liquid vehicle therein, which is removed from the joint material before the latter has set. Likewise, it is a known fact that the quality of the joint is also improved with respect to permeability, bond, density and shrinkage in proportion to the number of air and gas pockets which may be removed from the joint material before the latter has set.

I am cognizant of the fact that the pouring or pumping of joint material of a cementitious nature into a supposedly sealed area to form a pipe or other joint has been known. In these known methods, the joints are supposedly sealed prior to the pouring or pumping of the joint material into the proper area and no provision has been made for the extrusion of water, or the escape of air and gas between the time at which the joint annulus has been completely filled and the time that the joint material has received its initial set. This has resulted in the eventual breaking down of the joint, escape of the water from the pipes supposedly sealed with resultant damage to the surrounding areas and requiring repairs at great expense. My invention contemplates a method and means of forming a joint for pipes and similar bodies which will overcome these difficulties, the means of accomplishment being comparatively simple and inexpensive, but very efficient in operation.

For purposes of illustration, I have shown in the accompanying drawing a pair of pipe sections 1 and 2 of the spigot and socket or bell type, but my invention is not limited to this particular type of pipe nor to pipes alone as the same is capable of effective application to use in connection with any hollow bodies. Moreover, the pipe sections or bodies may be of any desired material.

The socket or bell section provides an internal shoulder or abutment 3 and applied externally to the inner end of the spigot section 1 is a gasket or internal seal 4. This seal is permeable, being formed of a material such as felt, or the like, impregnated with light oil, so that it may be stretched and molded slightly to accommodate the irregularities of the pipe surfaces to which it may come in contact. This seal is secured firmly to the exterior surface of the end of the spigot section, by means of a wire, or the like, 5, as clearly shown in Figure 1, and the ends of the said wire are entwined, as shown at 6, to secure the said seal, the seal acts as a spacer to maintain co-axial alignment of the surfaces of the pipe being joined. As stated, this seal 4 is permeable and has the characteristic, when under pressure exerted by the joint material, to permit water or other similar mixing vehicle, and gas entrained in the joint material, to pass therethrough, while definitely obstructing the passage of solid particles of the joint material.

When the spigot section is fitted into the bell or socket section of the pipe, as shown in Figure 1, the seal will be in position, as aforesaid, to permit the water or other mixing vehicle to pass therethrough, but will, as noted, preclude the passage therethrough of the joint material. I desire to provide, however, an external seal which forms an important portion of this invention. To this end, I provide a collar, identified by the numeral 7, formed of elastic material, such as rubber, or the like, molded or otherwise formed circularly, said collar being secured externally to the end of the bell or socket section 2 by means of the adjustable and removable band 8. When the spigot section is about to be brought into contact with the bell or socket section, this flexible external seal is bent backwardly over the securing band 8, in a fashion as shown in Figure 2 of the drawing, and after the spigot section with the internal seal 4 thereon is fitted properly into position in the bell or socket section, the rubber collar or external seal is bent to its effective position and securely locked on the spigot section 1 by means of the adjustable and removable band 9, as clearly shown in Figures 1 and 3 of the drawing. The collar is shown as a continuous form of circular section, but my invention is not limited to a continuous form but may be made of a strip of material, which when wrapped about the joint of the pipe and the butt ends secured by any known means, provides essentially the same collar as herein described and illustrated.

This external seal 7 formed in the shape of a collar, or the like, is finely perforated, as shown at 10, which will permit the escape of water, air and gas therethrough under pressure. This external seal is also provided at predetermined positions thereon with a series of larger openings 11 which are covered by internal and external flap valves 12. While I have shown flap valves of a conventional type, it will be understood that any type of valve which will serve the same purpose as flap valves may be used, as desired. These flap valves, as shown, are preferably formed of the same material of which the collar or seal 7 is formed, as for instance, rubber, and secured in position so that the same may be lifted or pushed out of position by hand to permit through the introduction of the openings 11 of the joint material. Obviously, the internal self-adjusting flap valve when in normal position will prevent the escape of the joint material through the openings 11, and the external self-adjusting flap valve, when in normal position will prevent the intrusion of water or other undesirable material into the joint annulus. When the joint lies above the surface of the water, and it is desired to introduce the joint material through one of the openings 11 to the joint annulus, it is preferable that a pair of flap valves be opened and held in open position by means of a stick or rod 13, as shown in Figures 1 and 6 of the drawing, which will enable the water or other liquid, air and gas that may have been in the joint annulus, to be expelled as the joint material is poured or pumped into the joint. When the joint lies below the surface of the water, the water in the joint annulus must be withdrawn by suction or other convenient means, after which the joint material may be introduced into the joint annulus. At intervals of short duration, a pair of flap valves at the top of the exterior seal may be intermittently opened to provide for the escape of air which the joint material has displaced in the joint annulus.

For the purpose of introducing the joint material to the pipe joint, I have shown in the drawing a conventional hand pump 14 from which is projected the hose 15 connected with a nozzle 16 containing a valve 17. This nozzle 16 is fitted into one of the openings 11 of the elastic and external seal 7 and securing collars 18 carried at the junction of the nozzle and hose may be engaged with the inner and outer surfaces of the rubber seal 7 surrounding the opening 11 to lock the hose and nozzle in position.

As shown in Figure 5, this nozzle from the pump hose is introduced into the annular space between the seal 7 and the joint near the bottom of the pipe and the joint material pumped into the annular space surrounded by this seal 7. As the material flows into this space, it will force the water, air and gas upwardly and outwardly through the one opening 11 which has its flap valves held open by the stick or rod 13. When all the free water, air and gas within the annular space have been expelled, the flap valves 12 may be closed and remain closed. As the joint material is pumped or otherwise injected into the annular space to a further extent, the exterior seal will expand substantially and the water, air and gas therein will be expelled under pressure through the perforations 10 in this elastic seal 7 and through the interstices of the inner seal 4, but none of the joint material will escape therethrough. Thus, as the joint material is allowed to set, it will contain the minimum of water, air and gas. As the setting takes place, there will naturally be a shrinkage and the elasticity of the external seal 7 will permit the latter constantly to exert a pressure of predetermined force upon the joint material, assuring an intimate union or bond of the joint material with the adjacent pipe surfaces.

It will be seen further that this type of external seal may be used as a flexible coupling, by means of which several lengths of pipe may be connected and moved into place, either before or after the joint is made therebetween.

Under certain conditions, it may be desirable to provide an interior seal, such as the seal 4, made of impermeable material, while the external elastic seal is permeable, as shown and described, and under certain other conditions, it may be desirable to have the inner seal 4 permeable, as heretofore described, and the elastic seal impermeable, the latter being accomplished by merely omitting the perforations from the elastic seal 7.

In Figure 6, I have shown a slight modified form of the invention wherein two pipe sections 19 and 20 of any desired formation are brought together in aligning position and a permeable elastic collar or seal 7a applied thereto at the joining ends of the sections, being secured in position thereon by the adjustable and removable bands 8a and 9a. This permeable elastic seal is the same as the seal previously described in connection with the preferred form of the invention, being provided with perforations of minute diameter and openings covered by flap valves. Prior to the application of the elastic seal 7a, however, I desire to apply externally to the abutting ends of the sections 19 and 20 the reinforcing framework 21. Thus, when the joint material is forced under pressure to the area surrounded by the elastic seal 7a, the same will come in intimate contact and bond with this reinforcing framework 21. This framework, obviously, will afford a means for retaining the joint material in position and act as a reinforcement therefor.

From the foregoing description of the construction of my improved device, the method of applying the same to use will be readily understood, and it will be seen that I have provided a comparatively simple, inexpensive and efficient means for carrying out the various objects of the invention.

While I have particularly described the elements best adapted to perform the functions set forth, it is apparent that various changes in form, proportion and in the minor details of construction may be resorted to, without departing from the spirit or sacrificing any of the principles of the invention.

Having thus described my invention, what I claim is:

1. A pipe section formed with a socket about one end, a second pipe section having an end fitting into said socket, a rubber sleeve fitting about the socket and the adjoining portion of the second pipe section, clamps about end portions of said sleeve securing the same in close fitting binding engagement with the portions of the pipe sections about which they fit, said rubber sleeve being formed with a multiplicity of minute perforations, an initially fluid joint material forced into the sleeve and entirely filling space enclosed by the sleeve, said sleeve being expanded by the introduced joint material and applying compressing pressure to the said joint material to compact the same and expel liquid therefrom through the perforations in the sleeve.

2. The structure of claim 1, wherein the rubber sleeve is formed with circumferentially spaced openings intermediate the socket and the end of the sleeve clamped about the second pipe section, one opening constituting an inlet for joint material and another constituting an outlet for air, and sheets of flexible rubber secured to inner and outer surface of said sleeve and partially free from the sleeve and constituting internal and external flap valves normally disposed flat against the sleeve in closing relation to the openings and movable to an opened position.

WALTER H. SCHOLL.

REFERENCES CITED

The following references are of record in the file of this patent:

UNITED STATES PATENTS

| Number | Name | Date |
| --- | --- | --- |
| 572,901 | Lehlbach | Dec. 8, 1896 |
| 1,237,003 | Weston | Aug. 14, 1917 |
| 1,462,077 | Weston | July 17, 1923 |
| 1,800,085 | Kroeger et al. | Apr. 7, 1931 |
| 1,823,974 | Ferguson | Sept. 22, 1931 |
| 2,055,885 | Weston | Sept. 29, 1936 |

FOREIGN PATENTS

| Number | Country | Date |
| --- | --- | --- |
| 360,146 | Great Britain | Nov. 5, 1931 |